A. Clark.
7696½ X
Coffee Mill.
Patented Aug. 4. 1833
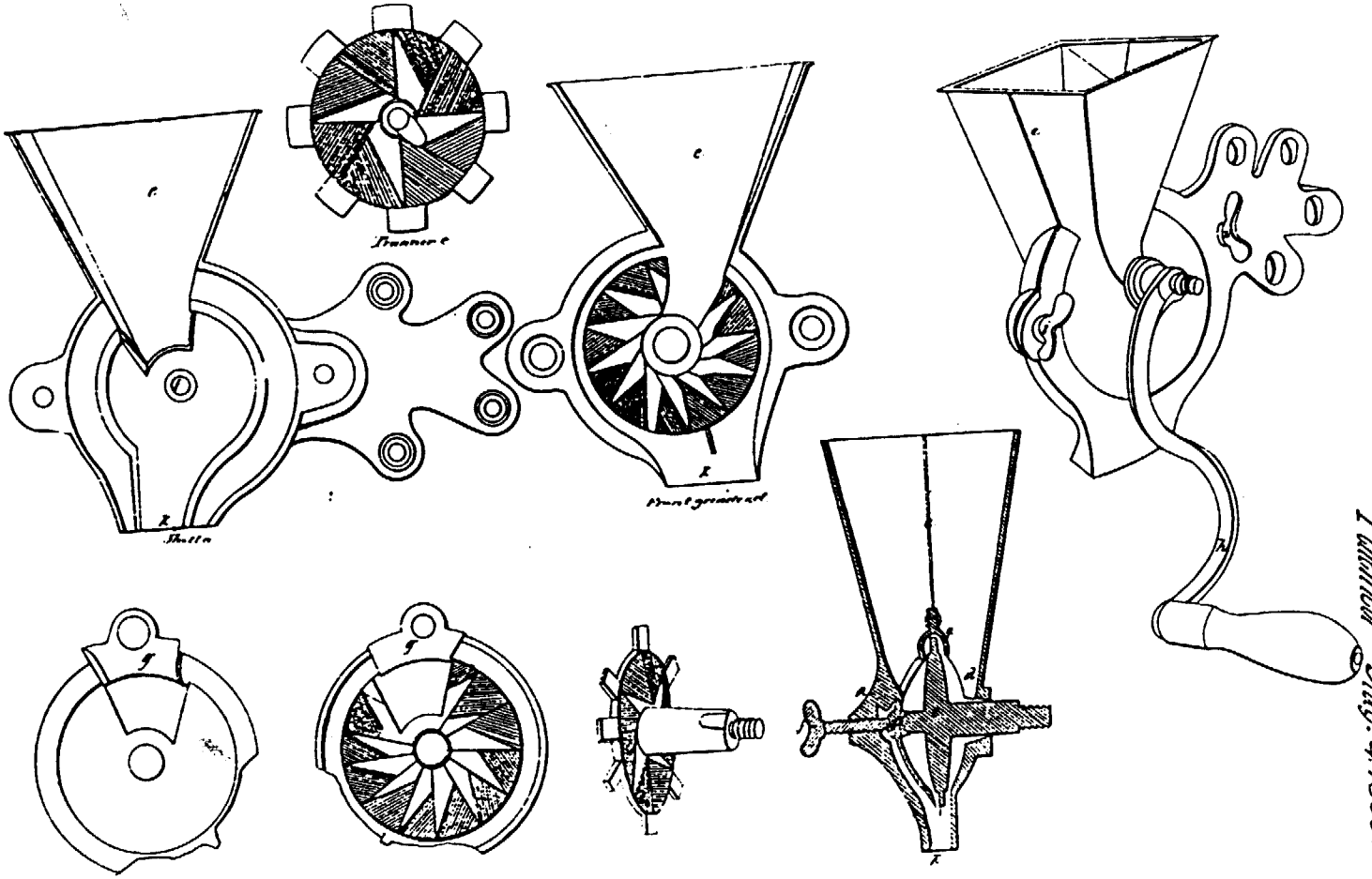
G. PETERS, PHOTO-LITHOGRAPHER, WASHINGTON, D. C.

8/14/1833 7696½X

Aug. 14. 1833

Ammi Clark's Coffee Mill
Letters Patent

The Schedule referred to in these Letters Patent and making part
of the same containing a description in the words of the said Ammi
Clark himself of his improvement in the Coffee Mill

---

Be it known that I Ammi Clark of Berlin in the County of Hartford and
State of Connecticut have invented a new and useful improvement in
Machinery for grinding Coffee and other substances, and that the following is an
exact description of the same as invented or improved by me. The mill thus
improved may consist of five pieces. First. The back part which is composed
of the back shell, one half of the hopper, the plate, the ears and one half of
the spout. Secondly. The back grinder which is moveable and of a convex
concave form, of a size suited to the back shell and resting with its con-
vex side on the concave side of the back shell. Thirdly. A convex-convex
runner with grinding teeth, on both sides, having an axle with bearings at
both ends, with a flange on the periphery, cut or divided as herein after
specified. Fourthly. The front grinder of a concave convex form, from which
extends the front half of the hopper, spout, and ears. Fifthly. The circular
segment curved so as to form a bead on one side, and a flute on the other
with an ear by which it is screwed or otherwise attached to the back.
Grinders. The back shell is concave on one side, and convex on the other,
with a circular flute, on the outer circle to admit the corresponding bead,
on the back grinder, and the guard rim of the same, to a depth nearly of the thick-
ness of the flange, segments, on the runner within the outer circle of the shells.
The circular flute, of the back shell, is cut away, on the upper side, sufficient-
ly to admit the back half of the hopper, the lower part whereof projects on the
concave surface of the shell, below the circular flute, a competent length,
to prevent the substance to be ground, from passing between the grinder and
the shell. The back grinder, herein before mentioned as the second piece has
[illegible] surface on the concave side, with a circular flute bounding
the grinding surface, [illegible] about one third of the periphery of the [illegible]

bottom which is open. The outer edge of this flange forms the guard rim, which
extends the same distance on the periphery as the flute. On the upper side of the
back grinder, where it passes through the hopper and above the guard rim is a
small projection, about half the thickness of the flange. On the runner, to which
projection is attached, an ear. Between the circular flute, and the casing of
the back grinder, near the upper side thereof, is an opening sufficient to admit
the lower extremity of the hopper, where it projects as aforesaid, or [illegible]
of the back shell, and to permit the substance to be ground to pass to the runner.
The flange of the runner aforesaid, is not continuous, but separated into segments
at convenient distances from each other, and extends from the edge of the grind
ing surface, across the circular flute, so as to bear upon the guard rim, and
prevent the grinding surfaces from wearing each other, whilst it facilitates
the cleaning of the mill. The inner, or concave surface of the front grinder, is
similar to the inner, or concave surface of the back grinder. From this front
grinder extend in their proper places, one half of the spout, one half of the
hopper, and the ears by which the mill is secured together. On the outer edge
of the circular guard rim, and projecting a little beyond it, is another cir
cular rim, corresponding with a like rim on the back shell and apply
ing thereto, when the mill is fastened together. The hopper being inserted
near the upper side, makes a breakage or vacancy in the circular flute.
The circular segment, with a flute, and bead, herein before mentioned, as the
fifth piece, fills out and supplies this vacancy, making by its insertion the
circular flute, continuous through the hopper. The mill is regulated by
means of a screw, passing through the centre of the back shell, and pressing
against the back grinder, more or less, as the substance to be ground may re-
quire. The mill, stands of course in a vertical position, and is turned by a
crank. — The mill above described, consists of four pieces, but the im
provement is applicable to mills having a greater or less number of pieces
than five; and the forms may be various. For example, a mill may be made
with the plate, on the front grinder, and a strap or bar of iron [illegible] the back
grinder, to supply the place of a back shell, with an opening in the back grind
er to admit the back half of the hopper. Or a mill may be made with the
hopper separate from the front grinder, an opening being left therein to admit 7696 1/2X a part of the hopper with ears near the top thereof to secure the parts together, and in this form the circular flute can be continued through the hopper with the circular segment, as in the mill herein first described: or, the part of the circular flute of the back grinder, passing through the hopper (and equal in size to the circular segment may be made separate from the grinder and [illegible] therein, being secured to the circular segment, or the said part of the said circular flute, and the circular segment may be united and made a whole distinct piece, so that in either case the segments of the flange, will pass through a continuous circular flute. Or the mill may be so cast as to be applied to a board with a hopper of tin or any suitable material. The preceding specification describes an improvement of the double mill, for grinding coffee &c, for which I have already obtained Letters Patent. The pieces, composing this double mill, and improvement, are of cast iron, but may be made of any other suitable materials.

I claim herein as my invention or improvement the following things namely to wit, the carrying of the circular flute, and the guard [illegible] through or across the hopper and the application to mills for grinding coffee and other substances, of the flange on the runner, separated into segments at convenient distances from each other as herein before described. Dated at Berlin, aforesaid this 17th day of June A.D. 1833.

Witnesses
Levi Barnes
Luther Bulkley

Ammi Clark

[illegible]

(1162 [illegible])